United States Patent [19]

Kashima et al.

[11] Patent Number: 5,442,523
[45] Date of Patent: * Aug. 15, 1995

[54] BACKLIGHTING DEVICE

[75] Inventors: Keiji Kashima; Naoki Yoshida, both of Kanagawa; Osamu Shoji, Tokyo; Eiichi Yanagi; Takumi Fukunishi, both of Kanagawa, all of Japan

[73] Assignee: Tosoh Corporation, Yamaguchi, Japan

[*] Notice: The portion of the term of this patent subsequent to Mar. 3, 2009 has been disclaimed.

[21] Appl. No.: 933,208

[22] Filed: Aug. 21, 1992

[30] Foreign Application Priority Data

Aug. 22, 1991 [JP] Japan ................. 3-233799
Sep. 4, 1991 [JP] Japan ................. 3-250327
Sep. 27, 1991 [JP] Japan ................. 3-275022
Oct. 29, 1991 [JP] Japan ................. 3-308196

[51] Int. Cl.$^6$ ........................... F21V 5/02; F21V 8/00
[52] U.S. Cl. ........................... 362/31; 362/26; 362/339
[58] Field of Search ............... 362/26, 27, 29, 30, 362/31, 223, 224, 244, 308, 327, 328, 339, 340

[56] References Cited

U.S. PATENT DOCUMENTS

| | | | |
|---|---|---|---|
| 3,131,496 | 5/1964 | Schropp | 362/31 |
| 3,752,974 | 8/1973 | Baker et al. | 362/31 |
| 4,729,068 | 3/1988 | Ohe | 362/31 |
| 4,822,145 | 4/1989 | Staelin | 362/31 |
| 4,924,356 | 5/1990 | French et al. | 362/223 |
| 4,937,709 | 6/1990 | Yanagi et al. | 362/31 |
| 4,985,809 | 1/1991 | Matsui et al. | 362/31 |
| 5,093,765 | 3/1992 | Kashima et al. | 362/31 |
| 5,130,898 | 7/1992 | Akahane | 362/31 |
| 5,134,549 | 7/1992 | Yokoyama | 362/31 |
| 5,178,447 | 1/1993 | Murase et al. | 362/31 |

FOREIGN PATENT DOCUMENTS 2165631 5/1985 United Kingdom .
8902606 3/1989 WIPO .

OTHER PUBLICATIONS

IBM Technical Disclosure Bulletin vol. 33, No. 9, Feb. 1992, pp. 261-262 "High Efficiency Back Light for LCD".
Patent Abstracts of Japan vol. 14, No. 445 (P-1110) Sep. 25, 1990 (JPA 21 76 629).

*Primary Examiner*—James C. Yeung
*Assistant Examiner*—Y. Quach
*Attorney, Agent, or Firm*—Sughrue, Mion, Zinn, Macpeak & Seas

[57] ABSTRACT

In a backlighting device for use with display panels that comprises a light conducting plate made of a light-transmissive material, one of the major faces of said light conducting plate being provided with a light diffusing capability and covered with a specular or light diffusing/reflecting plate, and a linear light source provided in proximity to the end portion of at least one side of said light conducting plate, the improvement wherein at least one sheet that is made of a light-transmissive material and that has a multiple of raised structures having straight ridgelines at minute intervals on the same side in such a manner that the ridgelines are substantially parallel to one another or at least one sheet that is made of a light-transmissive material and that has a multiple of pyramidal or conical projecting structures at minute intervals on the same side, said projecting structures having portions of such a shape that the vertical angles are substantially the same, is provided on the exit face of the light conducting plate in such a way that either type of structures face outward.

6 Claims, 8 Drawing Sheets

DISTANCE FROM LIGHT SOURCE

FIG. 11

DISTANCE FROM LIGHT SOURCE

BACKLIGHTING DEVICE

BACKGROUND OF THE INVENTION

1. Field of Industrial Utility

The present invention relates to a backlighting device for liquid-crystal panels that illuminates transmissive or semi-transmissive panels from the rear side.

2. Prior Art

Figure 1A:
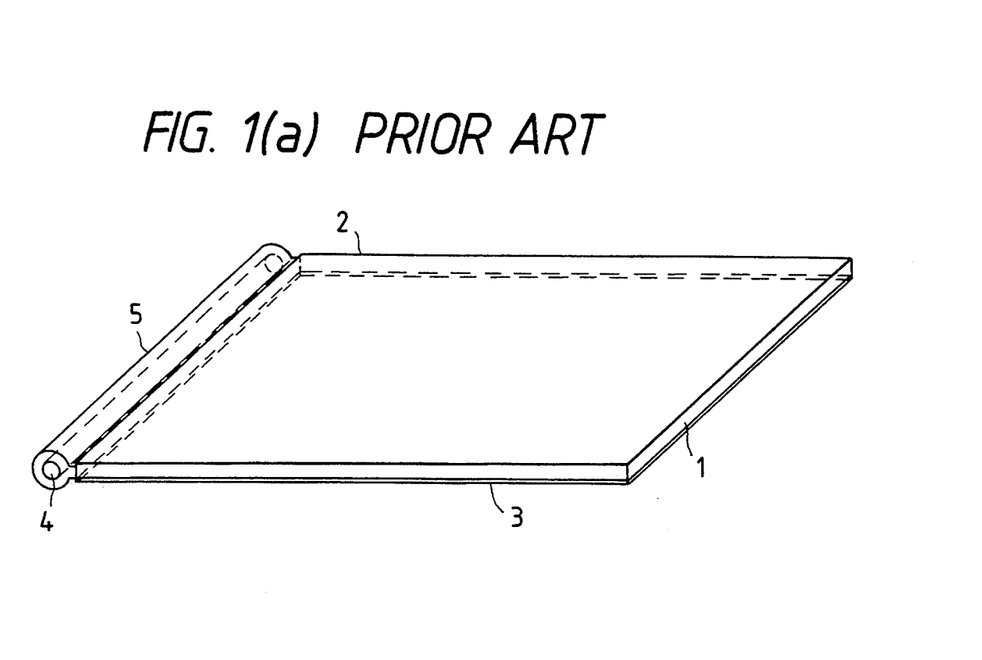
FIG. 1(a) is a perspective view of a conventional backlighting device operating on the "single lamp edge lighting" method.
Figure 1B:
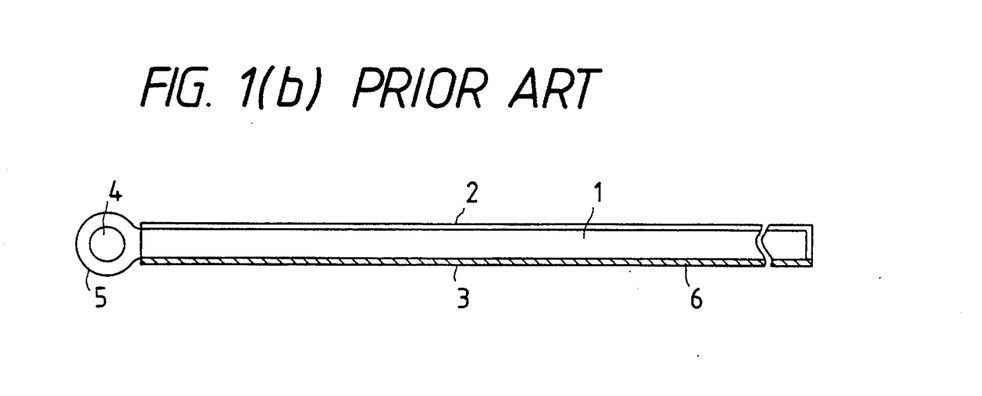
FIG. 1(b) is a cross-sectional view of the conventional backlighting device shown in FIG. 1(a)
Figure 2A:
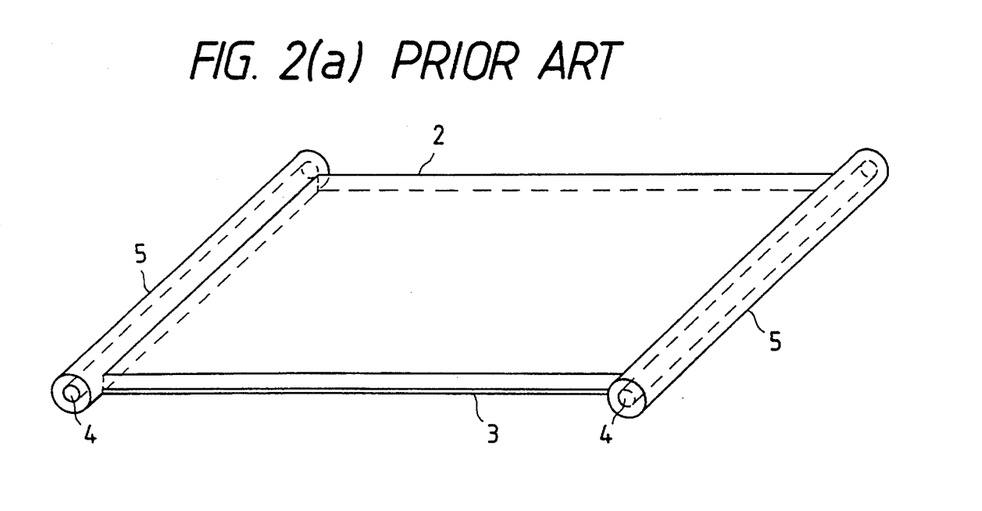
FIG. 2(a) is a perspective view of a conventional backlighting device operating on the "dual lamp edge lighting" method.
Figure 2B:
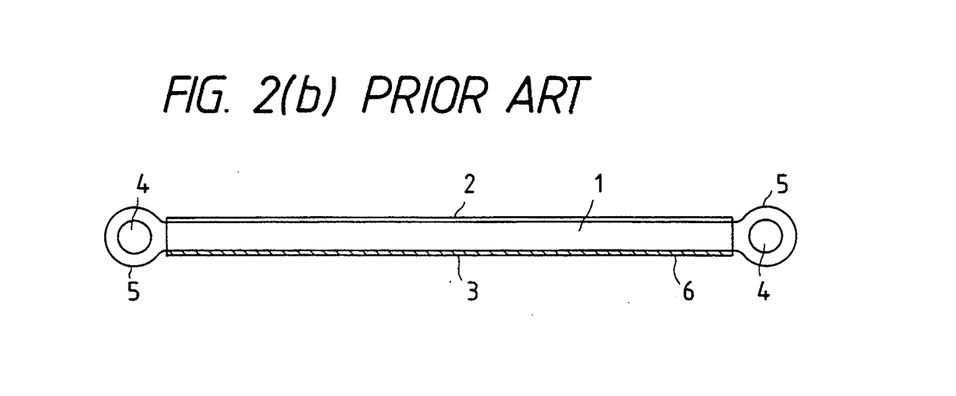
FIG. 2(b) is a cross-sectional view of the conventional backlighting device shown in FIG. 2(a)

Thin liquid-crystal displays provided with a backlighting mechanism that allows easy viewing of information on the screen are used with recent versions of laptop or book type word processors and computers. The backlighting mechanism in common use adopts a "single lamp edge lighting" method in which a linear light source such as a fluorescent tube is provided at one end portion of a transmissive light conducting plate as shown in FIG. 1(a), or a "dual lamp edge lighting" method in which a linear light source such as a fluorescent tube is provided at two end portions of a transmissive light conducting plate as shown in FIG. 2(a). As shown in FIGS. 1(b) and 2(b), one surface of the light conducting plate operating on those edge lighting methods is often covered partially with a light diffusing material and the thus covered area is almost entirely covered with a light diffusing/reflecting plate.

In addition, as is often the case today, backlighting devices are driven with a battery and a further improvement in the efficiency of power to luminance conversion is desired. To meet this need, it has been proposed that a light reflector covering the linear source be provided with a reflecting plate having high reflectance or that the area of the light conducting plate partially covered with the light diffusing material be provided with a reflecting plate having high reflectance. It is well known to utilize the Japanese Industrial Standard JIS K 7105, which was published in 1981, for testing and measuring the optical properties of plastic materials.

The methods described above achieve some improvement in the efficiency of power to luminance conversion but it is still insufficient and an even better improvement is desired.

SUMMARY OF THE INVENTION

An object, therefore, of the present invention is to provide a backlighting device that has a high efficiency of power to luminance conversion and which hence is capable of achieving high luminance.

The present inventors conducted various studies in order to solve the aforementioned problems of the prior art and found that when a transmissive sheet having a multiple of structures of a specified kind was provided on the exit face of a transmissive material (light conducting plate) given light diffusing ability, the directivity of light issuing from the exit face was enhanced to realize a backlighting device having a higher efficiency of power to luminance conversion in directions near a line dropped perpendicular to the exit face.

It was also found that a light conducting plate given a specified kind of light diffusing quality could produce a uniform luminance distribution.

According to its first aspect, the present invention provides a backlighting device for use with display panels that has a light conducting plate made of a light-transmissive material, one of the major faces of said light conducting plate is provided with a light diffusing capability and covered with a specular or light diffusing/reflecting plate, and a linear light source is provided in proximity to the end portion of at least one side of the light conducting plate. At least one sheet that is made of a light-transmissive material and that has multiple raised structures having straight ridgelines at minute intervals on the same side in such a manner that the ridgelines are substantially parallel to one another or at least one sheet that is made of a light-transmissive material and that has a multiple of pyramidal or conical projections at minute intervals on the same side, the projections having portions of such a shape that the vertical angles are substantially the same, is provided on the exit face of the light conducting plate in such a way that the sides intersecting on the ridgelines or the projections face outward.

According to its second aspect, the present invention provides a backlighting device for use with display panels that has a light conducting plate made of a light-transmissive material and a linear light source provided in proximity to the end portion of one or both sides of the light conducting plate. The light conducting plate having a light diffusing capability such as to produce a substantially constant haze value on the plate surface, all surfaces of the light conducting plate being covered with a light reflecting plate or film except at least the end portion of the side which is in proximity to the linear light source and on the exit face.

DETAILED DESCRIPTION OF THE PREFERRED EMBODIMENTS

The present invention is described below in detail with reference to the accompanying drawings.

Light conducting plate 1 may be made of any material that is capable of efficient light transmission, as exemplified by quartz, glass, or light-transmissive natural or synthetic resins such as acrylic resins. To impart light diffusing ability to the light conducting plate, one may apply a light-diffusing material 6 (FIGS. 3(b) and 4(b)) to part of the plate surface. Examples of the light diffusing material include paints and printing inks that contain titanium white, magnesium carbonate, barium sulfate, magnesium oxide and other pigments that have higher refractive indices and diffusion reflectances than the material of which the light conducting plate is made.

Paints and printing inks that contain silica or other materials that have refractive indices either substantially equal to or lower than those of the material of which the light conducting plate is made may also be used as long as silica or other materials have such a shape as to effect optical light diffusion.

Those light diffusive materials or silica or the like are screen-printed or otherwise printed in dots or strips on the surface of the light conducting plate. Alternatively, the intended light diffusing capability may be provided by roughening the surface of the light conducting plate and this can be accomplished by directly forming small holes or grooves in strips in the surface of the conducting plate or by providing small projections on that surface.

When imparting light diffusing quality to the conducting plate by one of the methods described above, the profile of that quality is preferably such that the density of he light-diffusing areas (e.g. the number of printed dots per unit area) will increase with the distance from the light source) and this is preferred from the viewpoint of a uniform luminance distribution.

In a preferred embodiment, linear light source 4 is covered with a reflector 5 in such a way as to provide a certain clearance between the outer surface of the light source and the inner surface of the reflector. The reflector has a slit formed in the surface thereof through which incident light from the linear light source is admitted into an end portion of the light conducting plate. The light source 4 is provided in proximity to at least one end face portion of the light conducting plate in such away that its central axis is substantially parallel to the end face of the light conducting plate.

The above-mentioned "edge lighting" method is higher than a "under lighting" method, in which a light source is disposed under a transmissive light conducting plate, in a light utilizing rate due to a following reason. Although it is possible to maximally utilize a reflecting light within the light conducting plate with a reflecting plate or the like in the "edge lighting" method, the "under lighting" method must have a shading plate into which a part of light is absorbed.

The linear light source 4 may be selected from among various types including a fluorescent tube, a tungsten incandescent tube, an optical rod and an array of LEDs. A fluorescent tube is preferred. From the viewpoint of power saving, it is preferred that the length of the portion capable of uniform light emission, not including the electrode portion is substantially equal to the length of the end portion of the light conducting plate which is in proximity to that emitting portion.

Figure 3A:
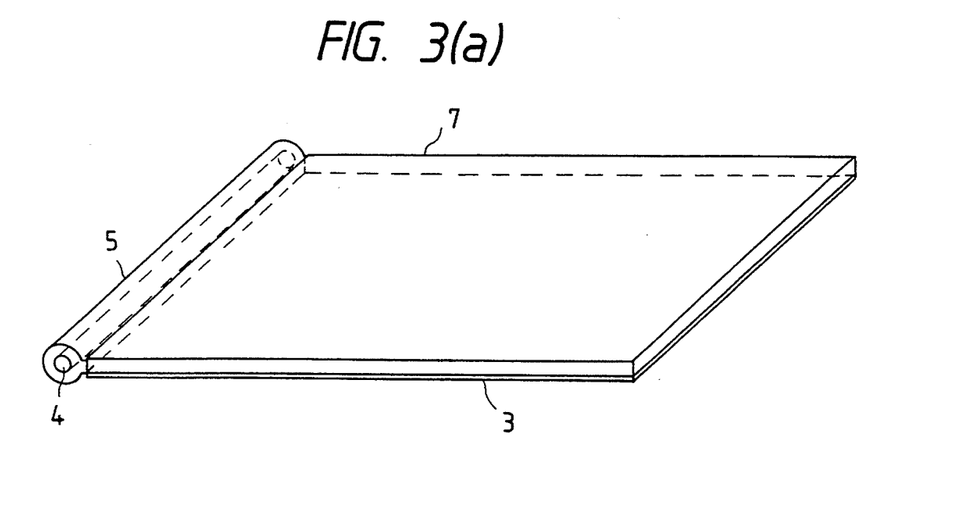
FIG. 3(a) is a perspective view of a backlighting device according to an embodiment of the "edge lighting" method in which a light source is provided at an end portion of a light conducting plate.
Figure 3B:
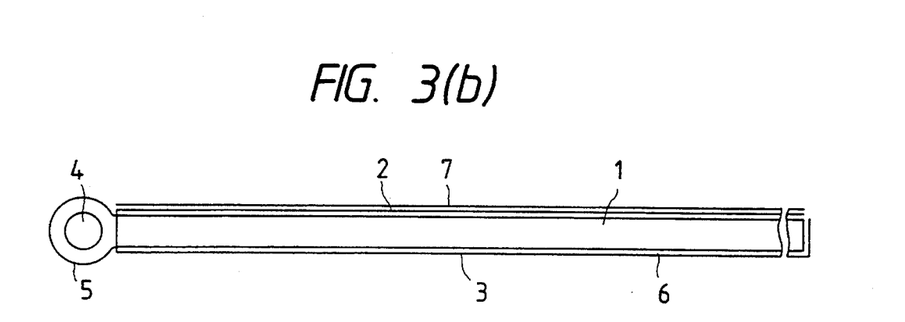
FIG. 3(b) is a cross-sectional view of the device.
Figure 4A:
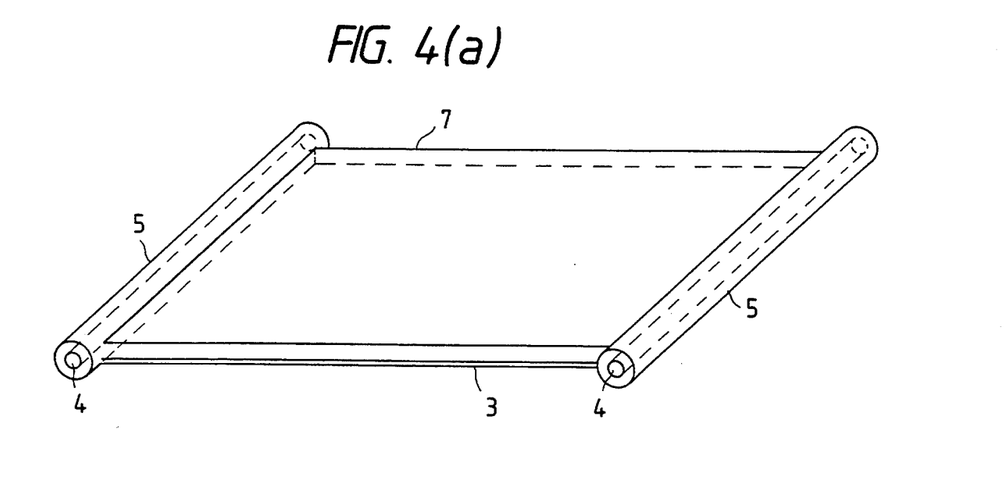
FIG. 4(a) is a perspective view of a backlighting device according to another embodiment of the "edge lighting" method in which a light source is provided at both end portions of a light conducting plate.
Figure 4B:
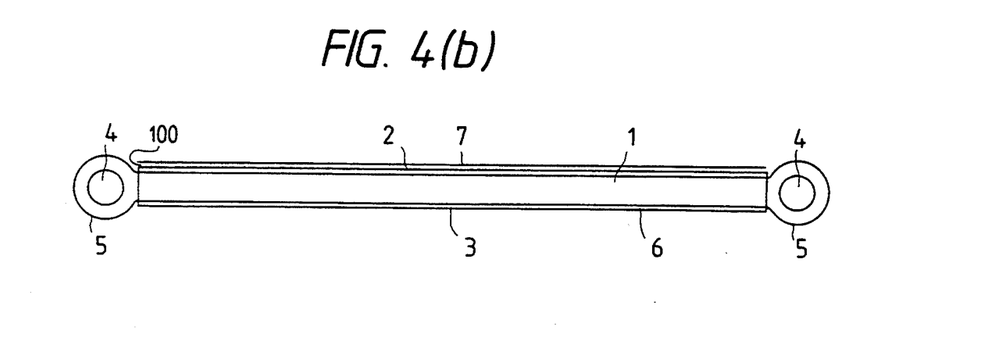
FIG. 4(b) is a cross-sectional view of the device.

The specular or light diffusing/reflecting plate 3 (FIGS. 3(b) and 4(b)) is provided in such away as to cover substantially all of the face of the light conducting plate that has been provided with light diffusing capability. If desired, the same plate may be provided in such a way as to additionally cover almost all of the other end face portion of the light conducting plate which is not in proximity to the linear light source. This is preferred from the viewpoints of efficient utilization of light and the accomplishment of uniform areal light emission. In this case, a layer of a material such as air that has a lower refractive index than the material of which the light conducting plate is made may be provided between the light conducting plate and the reflecting plate in a thickness at least equal to that of a monolayer of air, preferably no more than 2 mm. This is preferred for the purpose of enhancing the efficiency of light utilization.

A sheet 7 made of a light-transmissive material (which is hereunder referred to simply as "sheet") has multiple parallel straight ridgelines or pyramidal or conical projections that are formed at minute intervals on the same side. The sheet is provided in such a way that the sides intersecting at the ridgelines or the projections face outward (toward the side opposite the side facing the light conducting plate). The sheet changes the directivity of the light issuing from the exit face of the backlighting device in such a way that the directivity in directions close to a line dropped perpendicular to the exit face is enhanced. When using a sheet having the straight ridgelines described above, it may be provided in such a way that the ridgelines are parallel or perpendicular to the central axis of the linear light source. In a preferred embodiment, the sheet is provided in such a way when the backlighting device of interest is assembled in a display unit, in particular a liquid-crystal display unit, the straight ridgelines described above will lie parallel to the lateral direction of the level of vision. This layout is preferred in view of the visual contrast characteristics of the system.

In the present invention, one or more of the sheets under discussion are used; if desired, the light diffusing plate 2 (FIGS. 3(b) and 4(b)) may be provided in order to make undiscernible the dotted pattern of light diffusing function, say, the light diffusing material 6 which is imparted to the surface of the light conducting plate. With this arrangement, the relative increase in luminance as measured in the direction of a normal to the surface of the light conducting plate will be almost the same. If the light diffusing plate is provided outside the sheet, the relative increase in luminance as measured in the normal direction will decrease a little to reduce the directivity of light; however, this arrangement offers the advantage that when the backlighting device of interest is used with a liquid-crystal display unit, the development of a moiré pattern is inhibited.

If the sheet is to be placed directly on the surface of the light conducting plate, the two members are preferably in such a state that they are not in optical contact with each other. To meet this requirement, a member serving as a spacer may be provide between the sheet and the light conducting plate and an example of such a spacer member is the layer 100 of a material, such as air, that has a lower refractive index than the material of which the light conducting plate is made; if this layer is provided in a thickness of at least equal to that of a monolayer of that low-index material, preferably no more than 2 mm, the formation of bright spots on the light emitting surface is sufficiently inhibited to provide a uniform luminance distribution.

As already mentioned, the first aspect of the present invention is characterized in that a sheet that is made of a light-transmissive material and which has a configuration that satisfies the certain specified condition is provided on the exit face of the backlighting device.

The specified condition to be satisfied by the present invention is further elaborated below. The material used for sheet 7 described above is in no way limited as long as it is made of a light-transmissive material and examples include polyesters such as polymethacrylate esters, polycarbonates, polyvinyl, polyamides and polyethylene terephthalate (PET), poly-α-olefins, cellulosic resins and glass. The sheet may be made of the same material as the raised structures or pyramidal or conical projections. Alternatively, the raised structures or pyramidal or conical projections may be formed on a base film from dissimilar materials such as a uv curable resin.

Figure 5A:
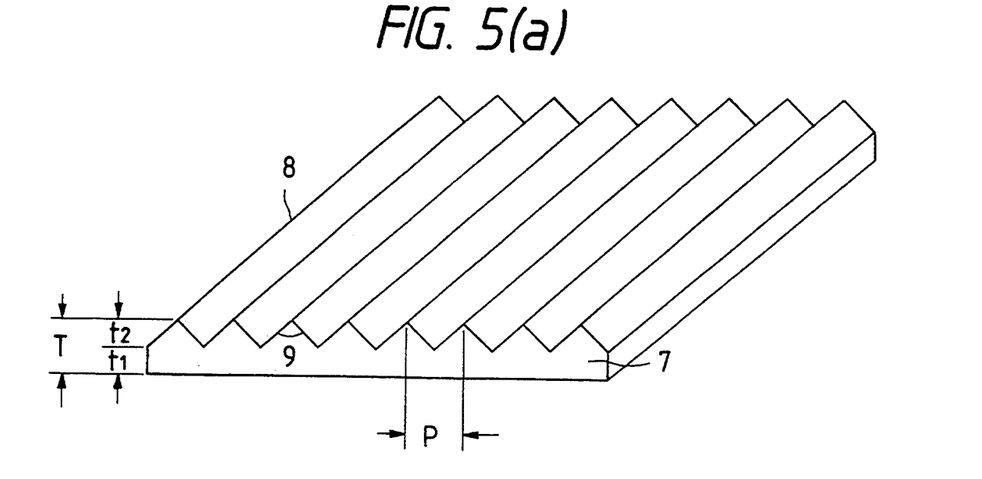
FIG. 5(a) is a perspective view showing a sheet having linear prism-like structures that is to be used in an embodiment of the present invention.

An example of the sheet that can be used in the first aspect of the present invention is one having raised structures that are provided on the exit face of the light conducting plate and which have parallel straight ridgelines. As shown in FIG. 5(a), the raised structures are shaped like "prisms" having optical planes; the ridgelines 8 on which two optical planes intersect each other are straight and multiple linear prisms that are parallel to one another are present in the same plane at minute intervals P. Those ridgelines which are formed on the sheet have portions of such a shape that the vertical angles are substantially the same and this means that when the prisms are cut through the vertex under the same conditions, their vertical angles are essentially the same.

For the purposes of the present invention, each of the vertical angles 9 of the ridgelines on the sheet (FIG. 5(a)) is preferably in the range of 70 to 150 degrees. The more preferred range of vertical angles is dependent on the refractive index of the material of the sheet to be used and on the luminous intensity distribution characteristics of the flat light emitter to be used. Consider, for example, the case where a material having high refractive index (i.e., polycarbonate; n=1.59) is used; in this case, the vertical angle of interest is preferably in the range of 90 to 110 degrees and if it exceeds 150 degrees, the effectiveness of the present invention is reduced; if the luminous intensity distribution characteristics are such that the light emerging from the flat light emitter is substantially concentrated within the range of 45 degrees from the direction of a line dropped perpendicular to the exit face, the vertical angle of interest is preferably in the range of 90 to 140 degrees.

A cross section of the raised structures on the sheet as taken in a direction perpendicular to the longitudinal axis is triangular and for maximizing the effectiveness of the present invention, it is particularly preferred to use raised structures having a cross section that is substantially an isosceles triangle which is equal in the length of two sides intersecting at the vertex of each ridgeline. In order to insure that the distance between adjacent straight raised structures formed on the sheet are difficult to discern under the light emitted from their surface, the distance between the ridgelines of adjacent parallel structures is preferably 10 to 1,000 μm. The thickness t2 of that part of the sheet which is occupied by the raised structures (FIG. 5(a)) is determined by the vertical angle of ridgelines and by the distance between adjacent ridgelines. It is at least necessary to provide a certain thickness for maintaining a number of raised structures at minute intervals and parallel to one another; this thickness t1 is preferably as small as possible in order to insure high transmittance of light rays and to realize a thin backlighting device. However, from the viewpoint of workmanship in the manufacture of sheets and in order to insure adequate strength, the total thickness (T) of the sheet is typically 10 to 3000 μm, preferably 50 to 1000 μm. To achieve better results in the present invention, the raised structures to be formed on the same side are preferably shaped identically.

Figure 5B:
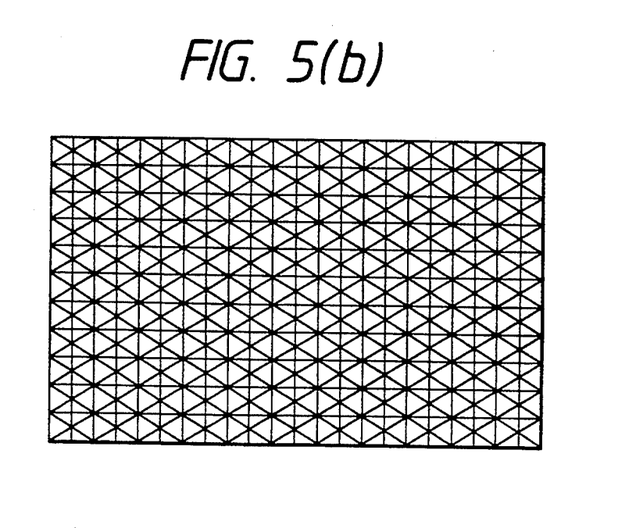
FIG. 5(b) is a plane figure showing a sheet having pyramidal prism structures that is to be used in an another embodiment of the present invention.
Figure 5C:
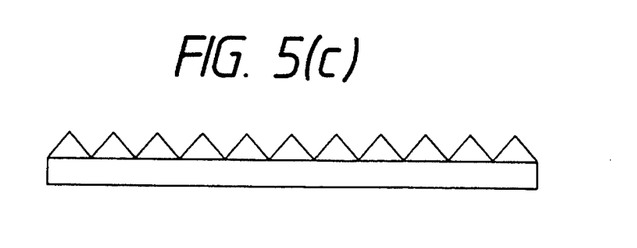
FIG. 5(c) is a cross-sectional view of the sheet shown in FIG. 5(b).

Another example of the sheet that can be used in the first aspect of the present invention is one having projections that are to be provided on the exit face of the light conducting plate and which are shaped like "prisms" having at least two optical planes. The projections are either in the form of pyramids such as a triangular prism and a quadrangular prism or in a conical form as shown in FIG. 5 (b)(c). The projections to be formed on the sheet have portions of such a shape that their vertical angles are substantially the same and this means that the vertical angles of vertex-including cross sections that are obtained under the same conditions are substantially the same. The expression "having portions of such a shape that the vertical angle are substantially the same" as used hereinabove should be taken broadly and allows for the case where pyramids of different kinds (n≧3; n is the number of sides forming a polygonal base) or cones are present in combination; even in that case, the conditions of the present invention are satisfied if the kind and number of pyramids (n≧3) or cones present in any area (e.g. a circle of 30 mm$^\phi$) of the projecting side of the sheet are nearly equal to the kind and number of pyramids (n≧3) or cones present in another area. For better effectiveness, it is preferred to use projections of identical shape and vertical angle. To further enhance the effectiveness of the present invention, it is particularly preferred to bring the surfaces of projections, within the limits of manufacturing tolerances, to optical planes (if the projections are pyramidal) and to optical curved surfaces (if the projections are conical); this means the asperities on the surfaces of projections should be made smaller than the operating wavelength of light within the limits of tolerances.

For the vertical angle of projections on the sheet, the distance between the vertices of adjacent projections, the thickness of the projecting part of the sheet and other design parameters, see the discussion above concerning the straight raised structures.

The method of shaping the sheets to be used in the present invention is in no way limited and various methods can be adopted, including molding with a hot press, embossing, casting, UV curring and chemical treatment. Because of process limits in the manufacture of sheets, a certain degree of sag will occur in the ridgelines but it is acceptable as long as it is within the range where the effectiveness of the present invention is insured.

A liquid-crystal display presents a lower contrast as the angle the line of vision forms with a line dropped perpendicular to the screen increases; therefore, the luminance as measured in directions close to the normal line defined above is held important in practical applications. This is all the more important for a viewfinder which is only looked at in directions parallel to the line normal to the image plane.

In the present invention, a sheet having a number of parallel structures as arranged at minute intervals on the side where outgoing light rays emerge is provided on the exit face of the backlighting device as already described above and this creates directivity of light. The improved light directivity is apparent from the following typical phenomena: first, the luminance of light issuing from the exit face as measured in a direction substantially parallel to a line dropped perpendicular to that exit face is higher than in the case where none of the sheets described above are provided; second, the luminance as measured in a direction at an angle of, say, 40 degrees with a line dropped perpendicular to the exit face is significantly lower than the value as measured in a direction substantially parallel to that normal line (in a typical case, the drop is almost 50% of the reference value).

According to another aspect of the present invention, there is provided a backlighting device using a light conducting plate that has such a light diffusing capability as to provide a substantially constant haze value over the plate surface, which is covered with a reflecting plate or film.

The expression "having a substantially constant haze value" means that the light conducting plate has a substantially constant haze value over almost all surface of the plate and it does not contemplate an embodiment in which the haze value is intentially changed as by varying the light diffusing capability of the plate surface with the distance from the light source (see the description of the first aspect of the invention). Therefore, unintentional variations in haze value that will occur when imparting the light diffusing capability are taken to be included within the scope of "being substantially constant" for the purposes of the present invention.

In a preferred embodiment, the haze value to be exhibited by the light conducting plate ranges from 0.5 to 50%. The effectiveness of the present invention will decrease if the haze value is outside this range. The term "haze value" as used herein means the value that is obtained by measuring on a major surface of the light conducting plate in accordance with JIS K 7105.

If one major surface of the light conducting plate is rendered to satisfy the haze condition set forth above, light incident at an end portion of the plate will not immediately emerge from the exit face but will instead undergo repeated internal reflection within the plate; in addition, light emerging from the conducting plate at the surfaces other than the exit face is returned to the interior of the plate by means of the reflecting plate which covers those surface other than the exit face of the conducting plate. As a result, the light incident at an end portion of the conducting plate is confined within the plate for a sufficient period to become uniform, thereby contributing to the manufacture of a backlighting device that features a uniform luminance distribution.

ADVANTAGES OF THE INVENTION

The backlighting device of the present invention is fairly compact, provides satisfactory luminance and can be operated with a high efficiency of power to luminance conversion in a direction parallel to a line dropped perpendicular to the exit face.

EXAMPLES

Comparative examples and working examples of the present invention are described below in order to further illustrate the present invention. A rectangular light conducting plate (225 mm × 127 mm; made of polymethyl methacrylate PMMA) having a thickness of 2 mm (see FIG. 3) was provided. A cold-cathode fluorescent tube (a normal tube of Harrison Denki K. K.) with a diameter of 4.8 mm was positioned in proximity to one of its shorter sides. The fluorescent tube was enclosed with a cylindrical aluminum reflector that was laminated with a lining of light diffusing film and which had a slit 2 mm wide in contact with the light conducting plate in such a way that light emerging through the slit would be admitted into the plate from one shorter side. A light diffusing material (a paint containing titanium white) was applied over the surface of the light conducting plate by screen-printing a pattern of circular dots on a pitch of 1.2 mm in such a way that the coverage with the light diffusing material would be 6% at the point for a minimum value (on the side facing the cold-cathode fluorescent tube) and 80% at the point for a maximum value, with the coverage being gradually increased in the intermediate area.

A light diffusing film (0.1 mm thick; D-204 of Tsujimoto Denki Seisakusho) was provided in the exit face of the light conducting plate. All surface of the light conducting plate except the entrance and exit faces were covered with another light diffusing film (125 μm thick; diffusion reflectance=83%; product of ICI Limited).

The areal luminance as produced when the cold-cathode tube was driven at a constant current with an alternating voltage (30 kHz) being applied from an inverter was measured with a luminance meter (Topcon BM-7) at a view angle of 2 degrees in a direction parallel to a line dropped perpendicular to the exit face, with the distance from the exit face to the luminance meter being 40 cm; the result was 192 cd/m$^2$ (Comparative Example 1).

A backlighting device was constructed and operated as in Comparative Example 1 except that a commercial polycarbonate sheet 360 μm thick that had a multiple of parallel linear prisms having a vertical angle of 90 degrees and which was worked to have a distance of 360 μm between adjacent ridgelines on linear prisms was provided on the exit face of the light diffusing film in such a way that the prisms would face outward. The luminance as measured on this backlighting device as in Comparative Example 1 was 307 cd/m$^2$ (Example 1).

A backlighting device was constructed and operated as in Example 1 except that the polycarbonate sheet was provided in the exit face of the light diffusing film in such a way that the prisms would face inward. The luminance as measured on this backlighting device as in Example 1 was 15 cd/m$^2$ (Comparative Example 2). Another backlighting device was constructed and operated as in Example 1 except that the vertical angle of linear prisms was changed to 70 degrees. The luminance as measured on this backlighting device as in Example 1 was 245 cd/m$^2$ (Example 2). Yet another backlighting device was constructed and operated as in Example 1 except that the vertical angle of linear prisms was changed to 100 degrees. The luminance as measured on this backlighting device as in Example 1 was 330 cd/m$^2$ (Example 3).

A backlighting device was constructed and operated as in Comparative Example 1 except that a sheet comprising a 50-μm thick PET base film that had a multiple of linear projections formed on it from a uv curable resin (acrylic resin) by printing was provided on the exit face of the light diffusing film in such a way that the linear projections would face outward; the base of each projection had a diameter of 50 μm and the height of each projection as measured from its base to top was 25 μm, with the distance between adjacent projections being 50 μm. The luminance measured on this backlighting device as in Comparative Example 1 was 235 cd/m² (Example 4).

Another backlighting device was constructed and operated as in Comparative Example 1 except that a sheet having a total thickness of 400 μm that was worked to have a multiple of projections in the from of a quadrangular prism having a vertical angle of 90 degrees in such a way that the distance between adjacent vertices of projections would be 400 μm was provided on the exit face of the flat light emitter in such a way that the projections would face outward. The luminance as measured on this backlighting device as in Comparative Example 1 was 322 cd/m² (Example 5). Yet another backlighting device was constructed and operated as in Example 5 except that the sheet was provided on the exit face of the flat light emitter in such a way that the projections would face inward. The luminance as measured on this backlighting device as in Example 5 was 23 cd/m² (Comparative Example 3). As is clear from these results, the first aspect of the present invention is characterized in that a sheet that is made of a light-transmissive material and on which a multiple of structures having portions of such a shape that the vertical angles are substantially the same are formed on the same side at minute intervals is provided on the exit face of a flat light emitter in such a way that the projecting side will face outward, and the effectiveness of the present invention is not exhibited if the sheet is provided on the exit face of the flat light emitter in such a way that the projecting side will face inward.

Two additional backlighting devices were constructed and operated as in Example 5 except that the vertical angle of each projection was changed to 70 degrees (Example 6) and 120 degrees (Example 7). The results of luminance measurement that was conducted on those devices as in Example 5 were 263 cd/m² and 359 cd/m², respectively. Another backlighting devices was constructed and operated as in Example 5 except that a multiple of convex lenses were formed of a uv curable resin by printing on a 50-μm thick PET base film in such a way that the base of each convex was 50 μm and the height of each projection as measured from its base to top was 25 μm, with the distance between adjacent projections being 50 μm. The luminance as measured on this backlighting device as in Example 5 was 258 cd/m² (Example 8).

Figure 6:
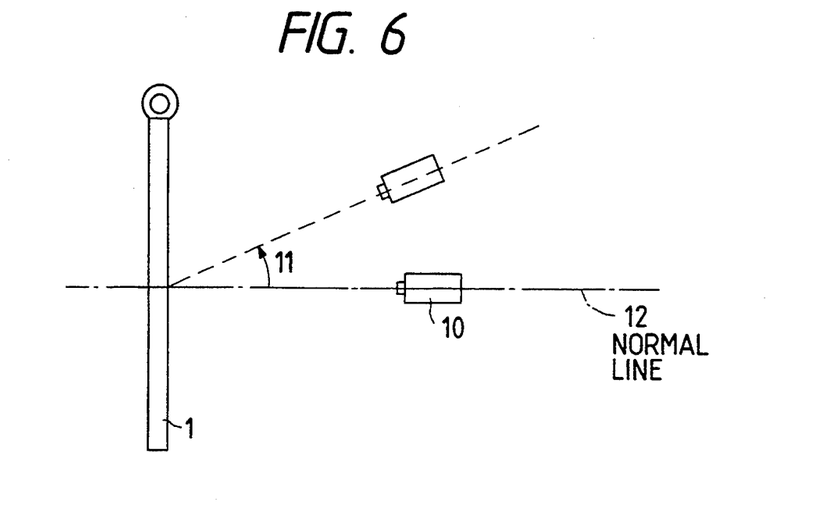
FIG. 6 is a diagram showing how a luminance measurement was conducted to evaluate the performance of the backlighting device of the present invention.
Figure 7:
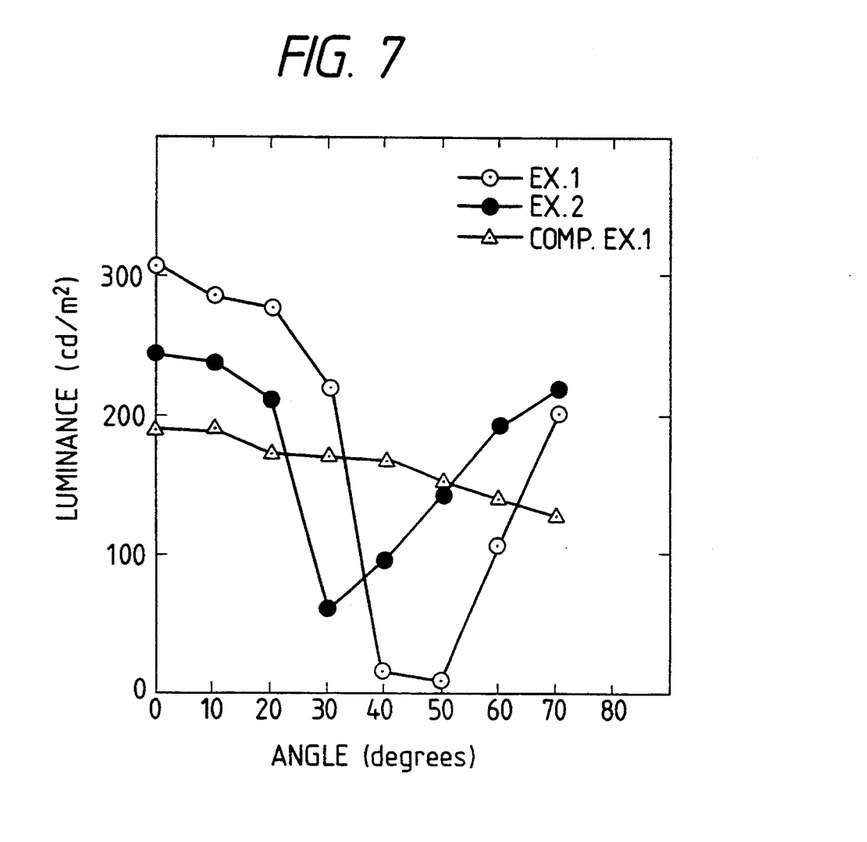
FIGS. 7 to 11 are graphs plotting the luminance distribution curves obtained in Examples and Comparative Examples.
Figure 8:
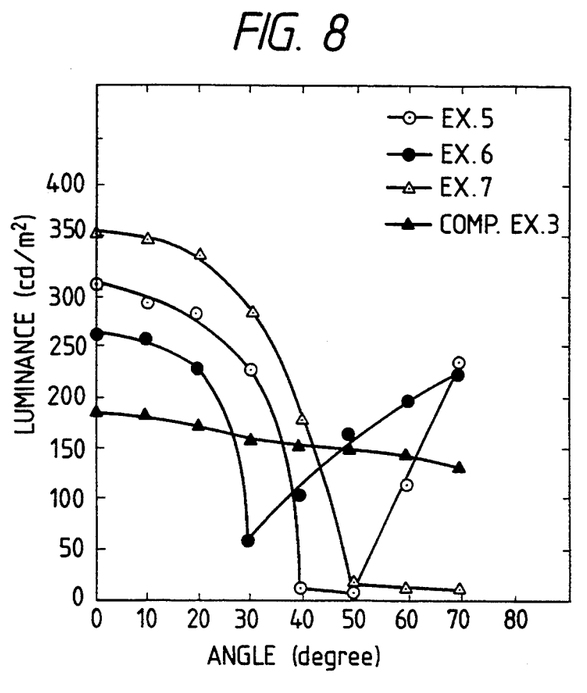

To investigate the luminous intensity distribution characteristics of various samples of backlighting device, areal luminance as produced when the cold-cathode tube was driven at a constant current with an alternating voltage (30 kHz) being applied from an inverter was measured by the experimental layout shown in FIG. 6 using a luminance meter (indicated by 10; Topcon BM-7) at a view angle of 2 degrees, with the distance from the exit face to the luminance meter being 40 cm while the angle (indicated by 11) the luminance meter formed with a line (indicated by 12) dropped perpendicular to the exit face was varied from 0 to 70 degrees in a direction perpendicular to the ridgelines of the linear projections formed on the sheet. The results of the measurement are shown in FIGS. 7 and 8, from which one can see that when the backlighting device of the present invention were used, the luminance was increased to achieve a marked improvement in the directivity of light.

Another experiment was conducted in the following manner. A cold-cathode fluorescent tube (a normal tube of Harrison Denki K. K.) with a diameter of 4.1 mm was positioned in proximity to both of the longer sides of a rectangular light conducting plate (made of PMMA measuring 255 mm × 157 mm) having a thickness of 8.0 mm. The fluorescent tube was enclosed with a silver (Ag) film having a slit 8 mm wide in contact with the light conducting plate in such a way that light emerging through the slit would be admitted into the plate from both longer sides. A light diffusing material (a titanium white containing paint) was applied over the surface of the light conducting plate by screen-printing a pattern of circular dots on a pitch of 1.0 mm in such a way that the coverage with the light diffusing material would be 40% at the point for a minimum value (on either side facing the cold-cathode fluorescent tube) and 98% at the point for a maximum value, with the coverage being gradually increased in the intermediate area. The surfaces of the light conducting plate other than the exit face were covered with a light diffusing/reflecting plate.

A light diffusing film (0.1 mm thick; D-204 of Tsujimoto Denki Seisakusho) was provided on the exit face of the light conducting plate. The areal luminance as produced when the cold-cathode tube was driven at a constant current with an alternating voltage (30 kHz) being applied from an inverter was measured with a luminance meter (Topcon BM-7) at a view angle of 2 degrees in a direction parallel to a line dropped perpendicular to the exit face, with the distance from the exit face to the luminance meter being 40 cm; the result was 1700 cd/m² (Comparative Example 4).

An additional backlighting device was constructed and operated as in Comparative Example 4 except that a commercial polycarbonate sheet 360 μm thick that had a multiple of parallel linear prisms having a vertical angle of 90 degrees and which was worked to have a distance of 360 μm between adjacent ridgelines on linear prisms was provided on the exit face of the light diffusing film in such a way that the prisms would face outward. The luminance as measured on this backlighting device as in Comparative Example 4 was 2970 cd/m² (Example 9).

Still another experiment was conducted in the following manner. A cold-cathode fluorescent tube (a normal tube of Harrison Denki K. K.) with a diameter of 4.1 mm was positioned in proximity to both of the longer sides of a rectangular light conducting plate (87 mm × 75 mm) having a thickness of 3.0 mm. The fluorescent tube was enclosed with a silver (Ag) film having a slit 3 mm wide in contact with the light conducting plate in such a way that light emerging through the slit would be admitted into the plate from both longer sides. A light diffusing material (a titanium white containing paint) was applied over the surface of the light conducting plate by screen-printing a pattern of circular dots on a pitch of 1.0 mm in such a way that the coverage with the light diffusing material would be 20% at the point for a minimum value (on either side facing the cold-cathode fluorescent tube) and 98% at the point for a maximum value, with the coverage being gradually increased in the intermediate area. The surfaces of the light conducting plate other than the exit face were covered with a light diffusing/reflecting plate.

A light diffusing film (0.1 mm thick; D-204 of Tsujimoto Denki Seisakusho) was provided on the exit face of the light conducting plate. The areal luminance as produced when the cold-cathode tube was driven at a constant current with an alternating voltage (30 kHz) being applied from an inverter was measured with a luminance meter (Topcon BM-7) at a view angle of 2 degrees in a direction parallel to a line dropped perpendicular to the exit face, with the distance from the exit face to the luminance meter being 40 cm; the result was 3840 cd/m² (Comparative Example 5).

An additional backlighting device was constructed and operated as in Comparative Example 5 except that a commercial polycarbonate sheet 360 μm thick that had a multiple of parallel linear prisms having a vertical angle of 90 degrees and which was worked to have a distance of 360 μm between adjacent ridgelines on linear prisms was provided on the exit face of the light diffusing film in such a way that the prisms would face outward. The luminance as measured on this backlighting device as in Comparative Example 5 was 5830 cd/m² (Example 10). Another backlighting device was constructed and operated as in Example 10 except that the vertical angle of linear prisms was changed to 70 degrees. The luminance as measured on this backlighting device as in Example 10 was 5236 cd/m² (Example 11).

When part of the light emerging from the flat light emitter undergoes total reflection within the prisms on the sheet before it is returned to the flat light emitter, the efficiency of the backlighting device is improved as the greater part of the surfaces of the flat light emitter other than the exit face is covered with a reflecting plate having high reflectance. To verify this effect, the following experiments were conducted. First, a backlighting device was constructed and operated as in Comparative Example 5 except that the reflecting plates covering the three non-exit faces of the light conducting plate were coated with a black paint. The luminance as measured on this backlighting device as in comparative Example 5 was 1690 cd/m² (Comparative Example 6). Another backlighting device was constructed and operated as in Comparative Example 6 except that a commercial polycarbonate sheet 360 μm thick that had a multiple of parallel linear prisms having a vertical angle of 90 degrees and which was worked to have a distance of 360 μm between adjacent ridgelines on linear prisms was provided on the exit face of the light diffusing film in such a way that the prisms would face outward. The luminance as measured on this backlighting device as in Comparative Example 6 was 2156 cd/m² (Example 12). Still another backlighting device was constructed and operated as in Example 12 except that the vertical angle of linear prisms was changed to degrees. The luminance as measured on this backlighting device as in Example 12 was 2035 cd/m² (Example 13).

Another series of experiments were conducted as in Comparative Example 1 except that the coverage of the light conducting plate with the circular dot pattern was held constant at 6% over the entire surface of the plate. The term "coverage" as used herein means the proportion of light diffusing elements that were formed per unit area of the light conducting plate. The light diffusing capability of those element on the light conductor as measured in terms of "haze value" in accordance with JIS K 7105 was 1.4%.

A light diffusing film (0.1 mm thick; D-204 of Tsujimoto Denki seisakusho) was provided on the exit face of the light conducting plate. All surfaces of the light conducting plate except the entrance and exit faces were covered with a light diffusing/reflecting film plate (125 μm thick; product of ICI Limited).

Figure 9:
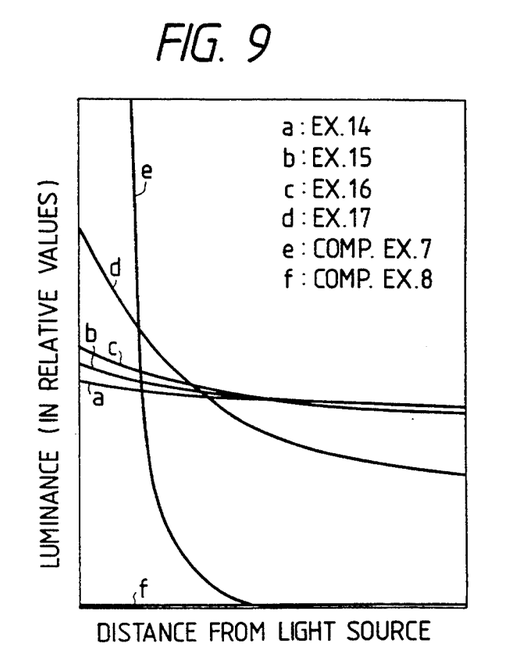

The areal luminance as produced when the cold-cathode tube was driven at a constant current with an alternating voltage (30 kHz) being applied from an inverter was measured with a luminance meter (Topcon BM-8) and the result is shown by curve a in FIG. 9 (Example 14). A luminance measurement was conducted under the same conditions except that the coverage with the light diffusing material was held constant at 7% and the result is shown by curve b in FIG. 9 (Example 15). The light diffusing capability of the light diffusing elements on the light conductor as measured in terms of haze value in accordance with JIS K 7105 was 1.5%. A luminance measurement was conducted under the same conditions except that the coverage with the light diffusing material was held constant at 9% and the result is shown by curve c in FIG. 9 (Example 16). The haze value was 1.9%.

A luminance measurement was conducted under the same conditions except that the coverage with the light diffusing material was held constant at 11% and the result is shown by curve d in FIG. 9 (Example 17). The haze value was 2.4%. Curves a to d show that the backlighting devices constructed in accordance with the present invention achieved a uniform luminance distribution.

A luminance measurement was conducted under the same conditions except that the coverage with the light diffusing material was held constant at 100% and the result is shown by curve e in FIG. 9 (Comparative Example 7). The haze value was 91%. Curve e shows that the backlighting device of Comparative Example 7 produced a very uneven luminance distribution.

A luminance measurement was also conducted under the same conditions except that no coating of light diffusing material was applied (0% coverage) and the result is shown by curve f in FIG. 9 (Comparative Example 8). The haze value was 0.3%. Curve f shows that the backlighting device of Comparative Example 8 produced very low luminance levels.

A rectangular light conducting plate (made of PMMA measuring 235 mm × 160 mm) having a thickness of 3 mm was provided. A cold-cathode tube (a 4.8-mmφ normal tube of Harrison Denki K. K.) with a diameter of 4.8 mm that was 7 mm longer than the shorter side of the plate was positioned in proximity to both of its shorter sides. The cold-cathode tube was enclosed with a tubular light reflector that was laminated with a lining of light diffusing sheet and which had a slit 3 mm wide in such a way that light emerging through the slit would be admitted into the plate from both shorter sides.

A light diffusing material was applied over the surface of the light conducting plate by screen-printing a pattern of circular dots on a pitch of 1.2 mm. A screen-image carrier was prepared by CAD in such a way that the coverage with the light diffusing material would be held constant at 16% (the haze value was 3.4%).

A light diffusing film (0.1 mm D-204 of Tsujimoto Denki Seisakusho) was provided on the exit face of the light conducting plate. All surfaces of the light conducting plate except the entrance and exit faces were covered with a light diffusing/reflecting film plate (125 μm thicks; produced of ICI Limited).

Figure 10:
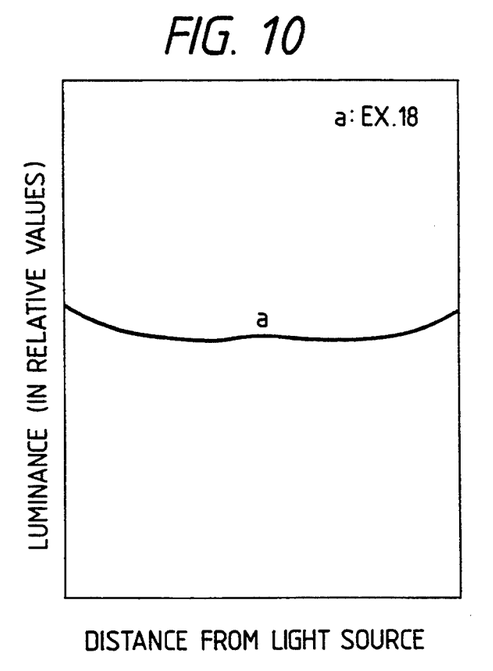

The areal luminance as produced when the cold-cathode tube was driven at a constant current with an alternating voltage (30 kHz) being applied from an inverter was measured with a luminance meter (Topcon BM-8) and the result is shown by curve a in FIG. 10 (Example 18).

A rectangular light conducting plate (86 mm×65 mm) having a thickness of 3 mm was provided. A cold-cathode tube (a 4.8-mm$\phi$ normal tube of Harrison Denki K. K.) with a diameter of 4.1 mm that was 12 mm longer than the longer side of the plate was positioned in proximity to both of its longer sides. The cold-cathode tube was enclosed with a tubular light reflector that was lined with a silver evaporated film and which had a slit 3 mm wide in such a way that light emerging through the slit would be admitted into the plate from both longer sides.

A light diffusing material was applied over the surface of the light conducting plate by screen-printing a pattern of circular dots on a pith of 1.0 mm. A screen-image carrier was prepared by CAD in such a way that the coverage with the light diffusing material would be held constant at 32% (the haze value was 45%).

A light diffusing film (0.1 mm; D-204 of Tsujimoto Denki Seisakusho) was provided on the exit face of the light conducting plate. All surfaces of the light conducting plate except the entrance and exit faces were covered with a light diffusing/reflecting film plate (125 thicks; product of ICI Limited) of Tsujimoto Denki Seisakusho).

Figure 11:
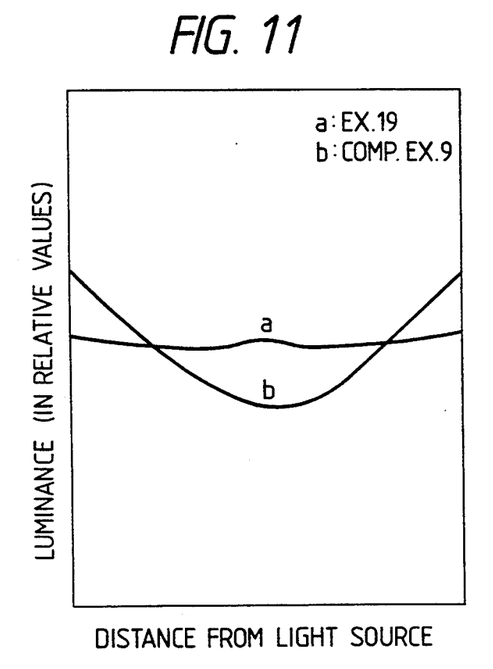

The areal luminance as produced when the cold-cathode tube was driven at a constant current with an alternating voltage (30 kHz) being applied from an inverter was measured with a luminance meter (Topcon BM-8) and the result is shown by curve a in FIG. 11 (Example 19).

A luminance measurement was conducted under the same conditions except that the coverage with the light diffusing material was held constant at 40% and the result is shown by curve b in FIG. 11 (Comparative Example 9). The haze value was 56%. One can see from curve b that the backlighting device of Comparative Example 9 produced a very uneven luminance distribution.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A backlighting device for use with display panels comprising:

a light conducting plate made of a light-transmissive material, one of the major faces of said light conducting plate being provided with a light diffusing capability and covered with one of a specular and light diffusing/reflecting plate;

a linear light source provided in proximity to at least one end portion of said light conducting plate; and directivity enhancing means provided on an exit face of the light conducting plate for enhancing a directivity of light emitted from said light conducting plate in directions close to a line dropped perpendicular to said exit face, said directivity enhancing means being entirely transparent and comprising at least one sheet that has a plurality of raised structures having straight ridgelines formed at minute intervals on a same side of said at least one sheet in such a manner that the straight ridgelines are substantially parallel to one another and said raised structures extend outward in a direction of light transmission, a distance between vertices of adjacent ones of said ridgelines being in a range of 10–1000 μm.

2. A backlighting device according to claim 1, wherein said at least one sheet and the raised structures are respectively formed of dissimilar materials.

3. A backlighting device according to claim 1, wherein surfaces of said raised structures intersect at an angle of 70 to 150 degrees to define said straight ridgelines.

4. A backlighting device for use with display panels comprising:

a light conducting plate made of a light-transmissive material, one of the major faces of said light conducting plate being provided with a light diffusing capability and covered with one of a specular and light diffusing/reflecting plate;

a linear light source provided in proximity to at least one end portion of said light conducting plate; and directivity enhancing means provided on an exit face of the light conducting plate for enhancing a directivity of light emitted from said light conducting plate in directions close to a line dropped perpendicular to said exit face, said directivity enhancing means being entirely transparent and comprising at least one sheet that has a plurality of one of pyramidal and conical projecting structures formed at minute intervals on a same side of said at least one sheet, said projecting structures having portions shaped such that angles formed by said structures with respect to a line perpendicular to said exit face are substantially the same, said projecting structures extending outward in a direction of light transmission, a distance between vertices of adjacent ones of said projecting structures being in a range of 10–1000 μm.

5. A backlighting device according to claim 4, wherein said angles are of 70 to 150 degrees.

6. A backlighting device according to claim 4, wherein said at least one sheet and the projecting structures are respectively formed of dissimilar materials.

* * * * *